3,262,970
CONDENSATION OF NAPHTHOIC ACID
AND FORMALDEHYDE
Emil F. Jason and Ellis K. Fields, Chicago, Ill., assignors to Standard Oil Company, Chicago, Ill., a corporation of Indiana
No Drawing. Filed July 25, 1962, Ser. No. 212,479
1 Claim. (Cl. 260—515)

This invention relates to dicarboxylic acids and particularly to novel aromatic dicarboxylic acids having a methylene bridge between the monocarboxylic aromatic nuclei, and to their preparation.

The novel aromatic carboxylic acids of this invention are the condensation products of naphthoic acid and formaldehyde. These new compounds are identified in the specification and claim as di(carboxynaphthyl)methane. An alternative term which can be used in identifying these dicarboxylic acids is methylenedinaphthoic acid. The structure of these new compounds is generically illustrated by the following formula:

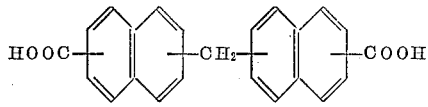

The condensation of naphthoic acid and formaldehyde yields a mixture of isomers, the chemical structure of which is extremely difficult to identify due to the number of reactive sites on the naphthalene nucleus to which the bridging methylene group may attach as well as the variation in the initial position of the carboxyl group on the naphthalene nucleus.

Ordinarily, the condensation of aromatic hydrocarbons such as alkyl substituted naphthylenes with formaldehyde produces polyarylmethylene compounds which are polymeric resins. It has been discovered, however, that when naphthoic acid is condensed with formaldehyde in accordance with this invention, that an isomeric mixture of di(carboxynaphthyl) methanes are formed with minimal amounts of polymeric materials.

Briefly, in accordance with this invention, 1- or 2-naphthoic acid is heated with formaldehyde or a polymer thereof such as paraformaldehyde in an acid liquid reaction medium comprising a $C_{2-4}$ aliphatic acid and a catalytic amount of a strong alkylation acid. Usually, the reaction mixture is refluxed at about atmospheric pressure and the aliphatic acid is employed as a solvent for the reactants, in amounts in excess of the reactants. Since the condensation product is insoluble in the aliphatic acid reaction solvent, the concentration of the reactants should be maintained within the range of from about 10% to about 60%. The aliphatic acids found suitable for use as the liquid reaction medium in this invention are acetic acid, propionic acid, and butyric acids. Preferably, the condensation reaction is initiated in anhydrous aliphatic acid for the concentration of water which is formed as a by-product of the condensation reaction should be kept at a minimum to minimize possible emulsion difficulties. Acetic acid is the preferred aliphatic acid to use as the solvent and reaction medium for the reactants.

Temperatures between about 50° and about 200° C. can be employed in the practice of this invention. The preferred temperature range is from about 105° to about 130° C. More specifically, the refluxing temperatures of acetic acid are preferred. Although atmospheric pressure is usually employed, the condensation reaction can be effected at either sub- or super-atmospheric pressures. The reaction period, which will be selected as related to the other reaction variables such as temperature and catalyst concentration, is ordinarily selected between about 1 and about 24 hours.

Inasmuch as the condensation of this reaction is a coupling of two molecules of naphthoic with a single methylene bridge, the preferred molar ratio of naphthoic acid to formaldehyde is 2:1, although formaldehyde may be present in greater amounts. Formaldehyde may be introduced into the reaction mixture as a gas, but is preferably incorporated in its polymeric form as paraformaldehyde which is capable of yielding monomeric formaldehyde under the reaction conditions. The use of formalin is not advisable because of the high concentration of water therein.

The alkylation catalysts suitable for catalyzing the condensation reaction of this invention are the known, strong alkylation acids such as the mineral acids, sulfuric, phosphoric, hydrochloric, and hydrofluoric; the organic sulfonic acids such as ethane sulfonic, benzene sulfonic, and toluene sulfonic acids; which acids may be used alone or in conjunction with perchloric, trifluoroacetic, and trichloroacetic acid. The preferred acid is concentrated sulfuric acid. The amount of the alkylation acid used to within the range of from about 0.01 to about 1 mole, preferably 0.1 to 0.5 moles, per mole of total reactants present in the reaction mixture.

An illustrative embodiment of this invention is the condensation of 2-naphthoic acid with paraformaldehyde. 3.0 g. (0.1 mole) paraformaldehyde was dissolved in 90 ml. of hot acetic acid. This solution was added in one portion to a stirred mixture of 34.4 g. (0.2 mole), 2-naphthoic acid, 100 ml., acetic acid, and 20 ml. (0.3 mole) of concentrated sulfuric acid. The reaction mixture was stirred and heated under reflux for 6 hours with precipitation of the solvent-insoluble condensation products occurring during the course of the reaction. Thereafter, the reaction mixture was cooled to room temperature and filtered. 15.4 g. (64 mole percent) of finely divided brown solids were recovered after washing the precipitate with acetone and drying thereof. The solids having an Acid Number of 312 (theoretical 314) were identified as an isomeric mixture of di(carboxynaphthyl) methane. Upon heating, the acid softens and turns black at 275°–280° C. and melts with decomposition at 340°–345° C. 11.2 g. of unreacted 2-naphthoic acid were recovered from the reaction mixture filtrate.

The novel dicarboxylic acid of this invention is useful for any purpose wherein dicarboxylic acids are used. They are particularly useful in the preparation of polyesters and polyamides. For example, a polyamide having a high thermal stability was obtained in the following manner. The acid chloride of the di(carboxynaphthyl) methane was prepared by reacting 3.56 g. (0.01 mole) in excess thionyl chloride under reflux conditions for 2 hours. The excess thionyl chloride was distilled off, and the distillation residue treated with 100 ml. chloroform to dissolve the acid chloride and filtered. The filtrate was added to a solution of 1.16 g. (0.01 mole) of 1,6-hexanediamine, 2 g. (0.05 mole) sodium hydroxide and 100 ml. water. Reaction was immediate with formation of a tan polymer. The polymer, upon heating, began to discolor at about 340° C. and was still solid at 400° C., at which time heating was discontinued. Thus, it will be apparent to one skilled in the art that this invention provides a simple means for converting an aromatic monocarboxylic acid to a highly desirable dicarboxylic acid which is a valuable chemical intermediate and can be used in the preparation of other valuable materials.

Thus having described the invention, what is claimed is:
The isomeric mixture of di(carboxynaphthyl) methane obtained by reacting naphthoic acid and formaldehyde, in a molar proportion of about 2 moles of naphthoic acid per mole of formaldehyde, in a liquid reaction medium consisting essentially of a $C_{2-4}$ alkanoic acid and a catalytic amount of a strong alkylation acid catalyst at a temperature and for a period of time sufficient to effect condensation of said naphthoic acid and said formaldehyde and thereby form said isomeric mixture.

References Cited by the Examiner

FOREIGN PATENTS 739,890  6/1955  Great Britain.

OTHER REFERENCES

Burckhalter et al.: "J. Am. Chem. Soc.," vol. 76, December 1954, page 6091.

Le Blanc et al.: "J. Org. Chem." vol. 26 (1961), pp. 4731–4733.

LORRAINE A. WEINBERGER, *Primary Examiner.*

LEON ZITVER, *Examiner.*

R. K. JACKSON, T. L. GALLOWAY,
*Assistant Examiners.*